(12) United States Patent
Diorio (10) Patent No.: US 11,893,446 B1
(45) Date of Patent: *Feb. 6, 2024

(54) RFID INTEGRATED CIRCUIT IDENTIFIER SELF-CHECK

(71) Applicant: Impinj, Inc., Seattle, WA (US)

(72) Inventor: Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,585

(22) Filed: May 20, 2022

Related U.S. Application Data (63) Continuation of application No. 17/019,385, filed on Sep. 14, 2020, now Pat. No. 11,341,343, which is a continuation of application No. 16/569,680, filed on Sep. 13, 2019, now Pat. No. 10,776,198, which is a continuation of application No. 15/251,152, filed on Aug. 30, 2016, now Pat. No. 10,417,085, which is a continuation of application No. 14/959,153, filed on Dec. 4, 2015, now Pat. No. 9,454,680, which is a continuation of application No. 13/865,993, filed on Apr. 18, 2013, now Pat. No. 9,239,941.

(60) Provisional application No. 61/723,944, filed on Nov. 8, 2012.

(51) Int. Cl.
| | |
|---|---|
| G06K 7/10 | (2006.01) |
| G06F 11/10 | (2006.01) |
| G06F 21/35 | (2013.01) |
| G06K 19/07 | (2006.01) |
| G06K 19/073 | (2006.01) |

(52) U.S. Cl.
CPC ...... *G06K 7/10019* (2013.01); *G06F 11/1004* (2013.01); *G06F 21/35* (2013.01); *G06K 7/10465* (2013.01); *G06K 19/0722* (2013.01); *G06K 19/0723* (2013.01); *G06K 19/07309* (2013.01)

(58) Field of Classification Search
CPC .......... G06K 7/10019; G06K 7/10465; G06K 19/0722; G06K 19/07309; G06K 19/0723; G06F 11/1004; G06F 21/35
USPC ..... 340/10.51, 10.1, 10.5, 5.85, 5.26, 572.4; 711/219; 365/192; 714/758
See application file for complete search history.

(56) References Cited

U.S. PATENT DOCUMENTS

| | | |
|---|---|---|
| 5,649,295 A | 7/1997 | Shober et al. |
| 6,034,603 A | 3/2000 | Steeves |
| 6,130,623 A | 10/2000 | MacLellan et al. |
| 6,499,656 B1 | 12/2002 | Marsh et al. |
| 7,253,717 B2 | 8/2007 | Armstrong et al. |
| 7,284,703 B2 | 10/2007 | Powell et al. |

(Continued)

OTHER PUBLICATIONS

Non-Final OA for U.S. Appl. No. 16/569,680, dated Dec. 31, 2019, pp. 25.

(Continued)

*Primary Examiner* — Nam V Nguyen
(74) *Attorney, Agent, or Firm* — Mannava & Kang, P.C.

(57) ABSTRACT

A Radio Frequency Identification (RFID) tag IC stores an identifier and a check code. The IC determines whether the stored identifier is corrupted by comparing it to the check code. If the stored identifier does not correspond to the check code then the IC may terminate operation or indicate an error. The IC may also reconstruct the correct identifier from the check code.

20 Claims, 6 Drawing Sheets

(56) References Cited

U.S. PATENT DOCUMENTS

| | | | |
|---|---|---|---|
| 7,450,010 B1 | 11/2008 | Gravelle et al. | |
| 7,479,874 B2 | 1/2009 | Kim et al. | |
| 7,555,616 B2 * | 6/2009 | Waters | G06K 19/0723 |
| | | | 340/572.5 |
| 7,742,348 B2 | 6/2010 | Schuessler | |
| 8,044,774 B1 | 10/2011 | Diorio | |
| 8,279,047 B2 | 10/2012 | Carrender et al. | |
| 8,340,134 B1 | 12/2012 | Gorshe | |
| 8,587,411 B1 | 11/2013 | Diorio | |
| 8,768,952 B2 | 7/2014 | Smith et al. | |
| 8,896,420 B2 | 11/2014 | Chang et al. | |
| 8,905,312 B2 | 12/2014 | Kargl | |
| 8,957,763 B2 | 2/2015 | Whitaker et al. | |
| 9,129,168 B1 | 9/2015 | Diorio et al. | |
| 9,158,948 B2 * | 10/2015 | Smith | G06K 7/01 |
| 9,239,941 B1 | 1/2016 | Diorio | |
| 9,454,680 B1 | 9/2016 | Diorio | |
| 10,417,085 B1 | 9/2019 | Diorio | |
| 10,776,198 B1 * | 9/2020 | Diorio | G06F 11/1004 |
| 11,341,343 B1 * | 5/2022 | Diorio | G06F 21/44 |
| 2008/0034183 A1 | 2/2008 | Drago et al. | |
| 2011/0252295 A1 * | 10/2011 | Beacham | G07C 5/006 |
| | | | 714/E11.032 |

OTHER PUBLICATIONS

2 Non-Final OA for U.S. Appl. No. 17/019,385, dated Oct. 5, 2021, pp. 18.

* cited by examiner

*RFID SYSTEM*

FIG. 1

*RFID TAG*

SIGNAL PATH DURING R→T

FIG. 5A

SIGNAL PATH DURING T→R

RFID INTEGRATED CIRCUIT IDENTIFIER SELF-CHECK

CROSS REFERENCE TO RELATED APPLICATIONS

This application is a continuation of U.S. application Ser. No. 17/019,385, filed on Sep. 14, 2020, now U.S. Pat. No. 11,341,343, which is a continuation of U.S. Application Ser. No. 16/569,680, filed on Sep. 13, 2019, now U.S. Pat. No. 10,776,198, which is a continuation of U.S. application Ser. No. 15/251,152 filed on Aug. 30, 2016, now U.S. Pat. No. 10,417,085, which is a continuation of U.S. Application Ser. No. 14/959,153 filed on Dec. 4, 2015, now U.S. Pat. No. 9,454,680, which is a continuation of U.S. application Ser. No. 13/865,993 filed on Apr. 18, 2013, now U.S. Pat. No. 9,239,941, which claims the benefit of U.S. Provisional Patent Application Ser. No. 61/723,944 filed on Nov. 8, 2012. The disclosures of the applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag integrated circuit (IC) that stores an identifier and a check code. The IC may determine whether the stored identifier is corrupted by comparing it to the check code. If the stored identifier does not correspond to the check code, the IC may terminate operation and/or indicate an error. The IC may also reconstruct the correct identifier from the check code.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by EPCglobal, Inc. ("Gen2 Specification"), version 1.2.0 of which is hereby incorporated by reference.

Figure 1:
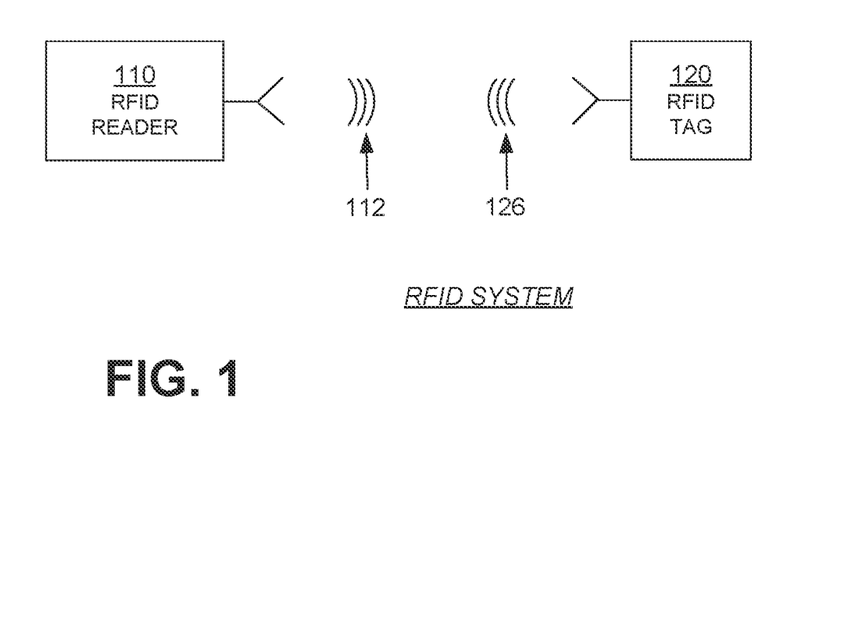
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
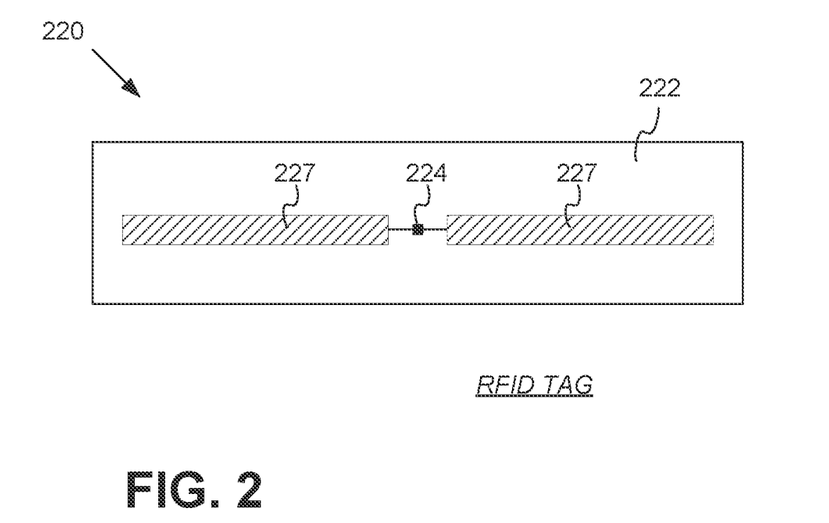
FIG. 2 is a diagram showing components of a passive RFID tag, such as a tag that can be used in the system of FIG. 1.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 227 which are shown here forming a dipole. Many other embodiments are possible using any number of ports, contacts, antennas, and/or antenna segments.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiment of FIG. 2, antenna segments 227 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, or any other suitable antenna.

The components of the RFID system of FIG. 1 may communicate with each other in any number of modes. One such mode is called full duplex. Another such mode is called half-duplex, and is described below.

Figure 3:
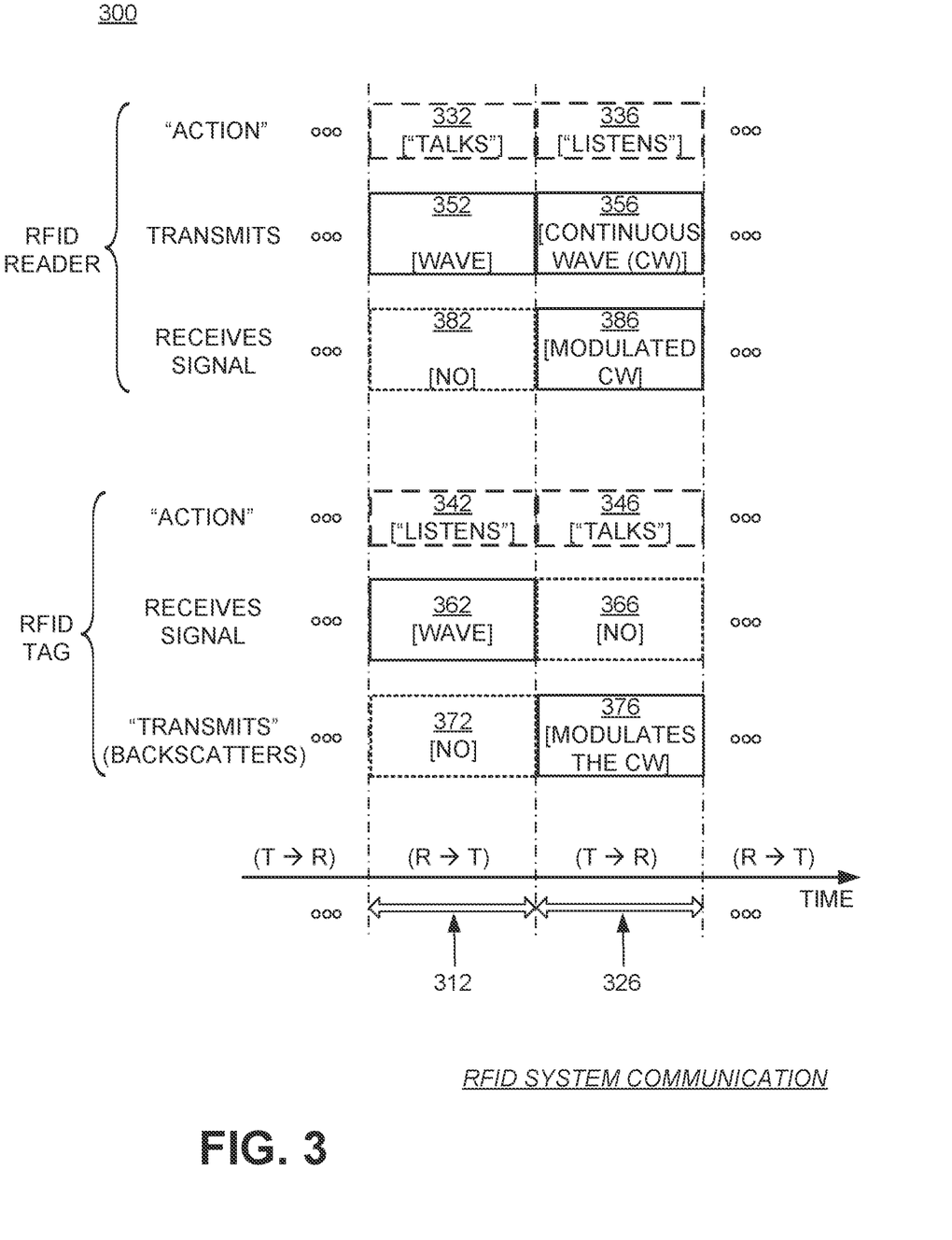
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
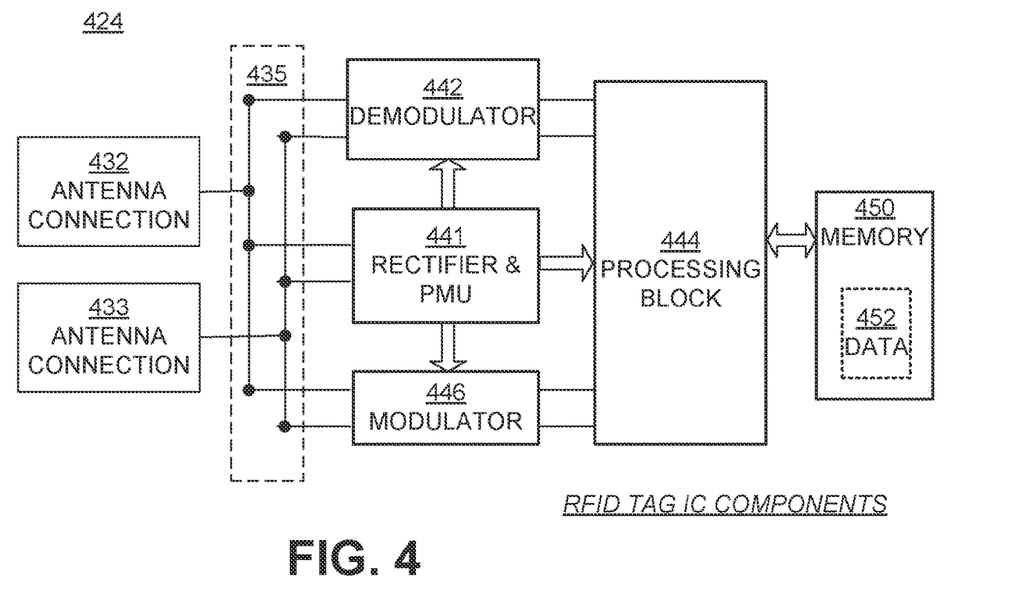
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two antenna contacts 432, 433, suitable for coupling to antenna segments such as segments 227 of RFID tag 220 of FIG. 2. When two antenna contacts form the signal input from and signal return to an antenna they are often referred-to as an antenna port. Antenna contacts 432, 433 may be made in any suitable way, such as from metallic pads and so on. In some embodiments circuit 424 uses more than two antenna contacts, especially when tag 220 has more than one antenna port and/or more than one antenna.

Circuit 424 also includes signal-routing section 435 which may include signal wiring, a receive/transmit switch that can selectively route a signal, and so on.

Circuit 424 also includes a rectifier and PMU (Power Management Unit) 441 that harvests energy from the RF signal received by antenna 227 to power the circuits of IC 424 during either or both reader-to-tag (R-T) and tag-to-reader (T-R) sessions. Rectifier and PMU 441 may be implemented in any way known in the art.

Circuit 424 additionally includes a demodulator 442 that demodulates the RF signal received via antenna contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving antenna contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
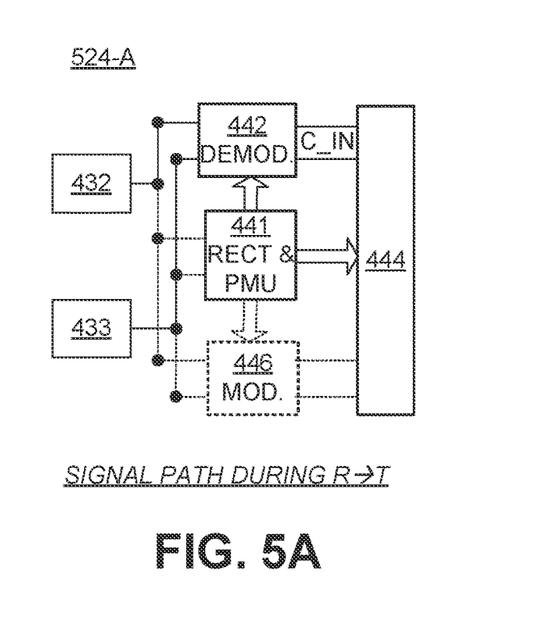
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from antenna contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
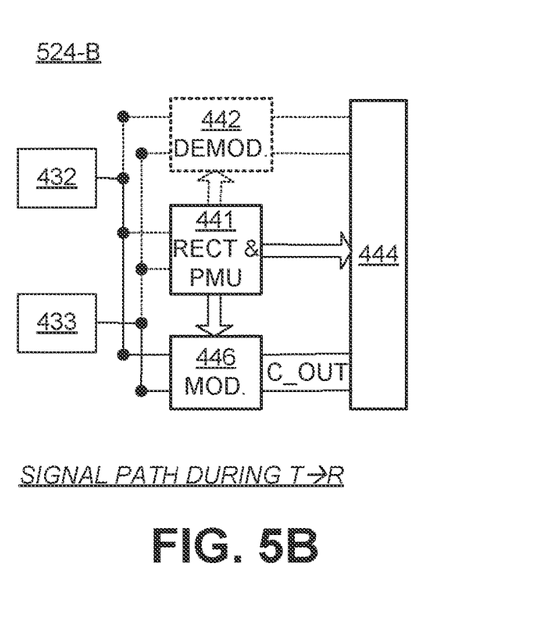

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 227 of RFID tag 220 via antenna contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification referenced above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications.

Figure 6:
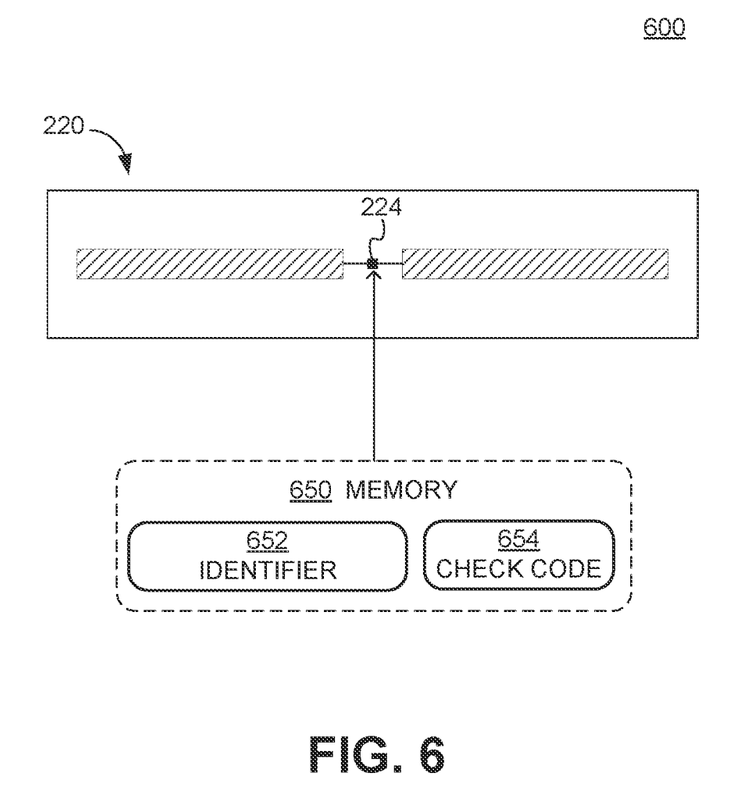
FIG. 6 illustrates an identifier and a check code stored in an RFID tag IC according to embodiments.

FIG. 6 illustrates an identifier and a check code stored in an RFID tag IC according to embodiments.

Diagram 600 depicts memory 650, which may be included in tag IC 224. In some embodiments memory 650 may be external to IC 224 (e.g., on another IC or on a different component on the tag) or integrated into a controller or processing block (e.g., processing block 444). Memory 650 may store a variety of data, such as an identifier 652 that provides information about IC 224, tag 220, and/or an item to which tag 220 is attached. For example, identifier 652 may identify the tag IC, tag, or item, or may indicate some detail or attribute of the tag IC, tag, or item. Identifier 652 may be but is not limited to a tag identifier (TID), a key identifier (KID), an item identifier such as an electronic product code (EPC), a universal product code (UPC), a stock-keeping unit (SKU) number, a unique item identifier (UII), a serialized global trade identification number (SGTIN), or any other suitable identifier.

Memory 650 may also store a check code 654, which is typically based on identifier 652 and may be used to check the validity or correctness of identifier 652. Check code 654 may be a parity bit or bits, a checksum, a cyclic redundancy check, a hash function output, an error-correcting code, or any other suitable code. As one of many possible examples, identifier 652 may be stored in one or more differential memory cells and check code 654 may be stored in the complementary halves (i.e. complementary transistor or complementary bit) of the one or more differential memory cells. In some embodiments, check code 654 may be used to reconstruct the correct identifier if identifier 652 is found to be incorrect or corrupt. In some embodiments, check code 654 may also (or instead) indicate if memory 650 (or a portion of memory 650) has malfunctioned or failed. For example, check code 654 may include redundancy bit(s) that indicate whether one or more memory cells have failed, or any other code that indicates whether physical memory is functioning properly.

Identifier 652 and check code 654 may be stored in memory 650 when IC 224 is manufactured, when tag 220 is assembled, when tag 220 is printed, when tag 220 is attached to an item, or at any other suitable time. Check code 654 may be stored at the same time as identifier 652, at a different time from identifier 652, or computed by IC 224 itself. For example, an IC (or tag) manufacturer may generate and write identifier 652 into memory 650. The manufacturer may then generate check code 654 based on identifier 652 and write the generated check code 654 into memory 650.

In some situations, identifier 652 and/or check code 654 may contain errors, latent errors, or be corrupted. For example, identifier 652 and/or check code 654 may not be written strongly enough to memory (e.g., with insufficient voltage/current), and latent errors may occur when one or more bits of identifier 652 or check code 654 decay. In another example, manufacturing flaws may cause one or more bits of memory 650 to be defective or leaky, causing initially correct data to accumulate errors over time. In another example, exposure to radiation may cause written memory bits to flip or decay, introducing errors. As such, it may be desirable to have a tag IC perform a data integrity self-check procedure upon power-up. If the IC determines that its data is not corrupted, it may continue operation as normal. If the IC determines that its data is corrupted, it may indicate an error, perform a self-correction procedure, and/or shut itself down, temporarily or permanently.

Figure 7A:
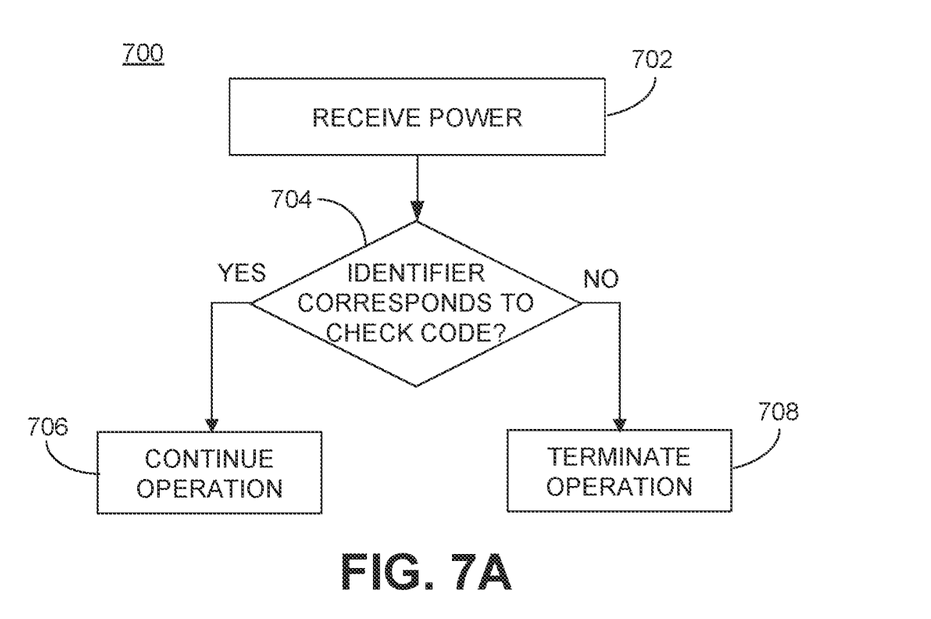
FIGS. 7A-B are flowcharts depicting processes for identifier self-check according to embodiments.

FIG. 7A is a flowchart depicting a process 700 for identifier self-check according to embodiments. In step 702, a tag IC (e.g., IC 224) receives sufficient power to operate. For example, the IC may extract operating power from an RF signal, such as may be transmitted by RFID readers. In some embodiments, if the IC is coupled to a power source (e.g., as is the case in a semi-passive or active tag), the IC may receive sufficient power to operate independent of whether an RF signal is being received. Once the IC is powered, in step 704 it may retrieve an identifier (e.g., identifier 652) and a check code (e.g., check code 654), both stored in memory, and check to determine if the retrieved identifier corresponds to the retrieved check code. One of the many possible methods of checking involves the IC computing a new check code from the retrieved identifier and comparing the new check code with the retrieved check code. If the new check code corresponds to the retrieved check code then the IC may determine that the identifier is correct, and continue operation in step 706. On the other hand, if the new check code does not correspond to the retrieved check code then the IC may terminate operation in step 708. The IC may terminate operation by powering down, killing itself (e.g., by asserting a "kill" flag associated with the IC), or not responding to external commands. For example, if the IC powered up in response to receiving an RF signal transmitted by an RFID reader, it may refrain from responding to a subsequent command from the reader.

Figure 7B:
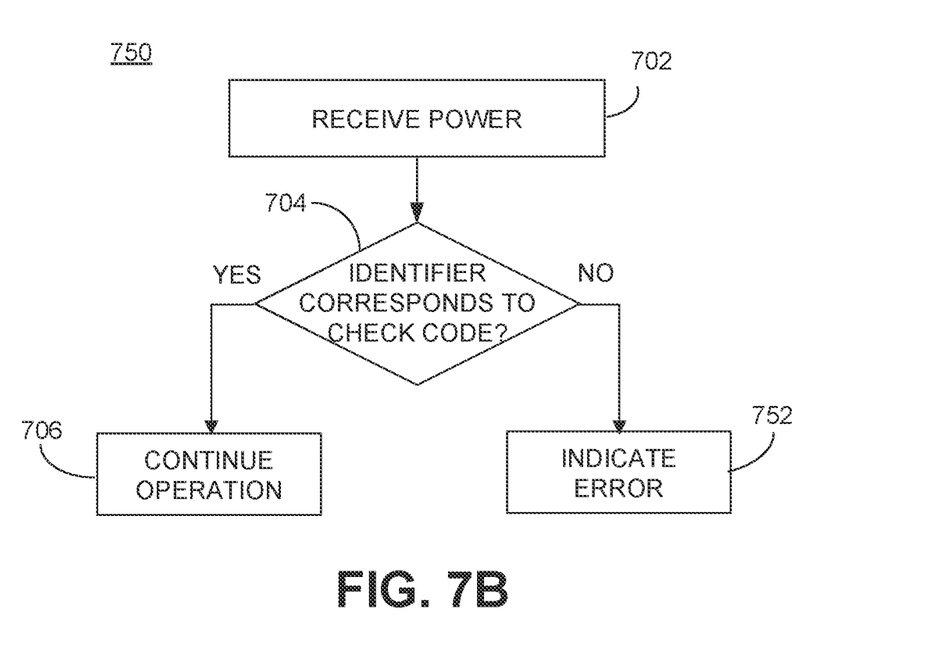

FIG. 7B is a flowchart depicting another process 750 for identifier self-check according to embodiments. Steps 702, 704, and 706 in process 750 are similar to the corresponding steps in process 700. However, in process 750, if the IC determines in step 704 that the retrieved identifier does not correspond to the retrieved check code then the IC may indicate an error in step 752. The IC may indicate an error by, for example, backscattering an error or corruption code, writing the error or corruption code to memory, rewriting a portion of its memory (e.g., rewriting a memory portion such as a length field to subsequently exclude the corrupted portion of the identifier or the entire retrieved identifier from a subsequent operation), asserting an error/corrupted identifier flag, and/or adjusting an IC session flag. After indicating an error in step 752 the IC may terminate operation (as in step 708 in process 700), or may continue operation (e.g., proceed to step 706).

As mentioned, in step 752 the IC may transmit or backscatter an error or corruption code to indicate that the retrieved identifier does not correspond to the retrieved check code, such as in a reply to a reader command. In some embodiments the IC may include an alternative identifier with the error/corruption code. In other embodiments the IC may include the corrupted identifier with the error/corruption code. The IC may include both the alternative and the corrupted identifier, or portions of one or both identifiers, or other information that may be useful to the reader or to the reading system. For example, if the IC receives a command from a reader requesting an item identifier that the IC has determined is corrupted then the IC may include an error/corruption code, an alternative identifier such as a tag or IC identifier, and/or the corrupted item identifier in the reply.

In some cases the error/corruption code may indicate the presence and/or nature of the included identifier(s). For example, the error code may indicate that the reply includes identifier(s), and may also indicate whether the included identifier(s) is an alternative identifier, the corrupted identifier, or another code. In some embodiments, the error code may include protocol control information (e.g., protocol control bits according to the Gen2 Specification) corresponding to identifiers either included in the reply or stored in memory. Protocol control information associated with data may be used to indicate the length of the associated data. In some embodiments, an identifier that is determined to be corrupted may in effect be altered by adjusting its associated protocol control information. For example, a corrupted identifier may be shortened or even set to zero length (in effect "erasing" it) by adjusting its associated protocol control information. The adjusted protocol control information may then be included in the reply to indicate that the requested identifier is corrupted. In some embodiments, the reply may also include an error-check code (e.g., similar to check code 654) computed by the IC over the reply. For example, the IC may compute the error-check code based on one or more components of the reply (e.g., the error/corruption code, the alternative identifier, the corrupted identifier, and/or any other code included in the reply) and include the computed error-check code in the reply.

While the example above assumes that the corrupt code is the item identifier, the same procedure may be used if any other identifier or code is corrupted. For example, if the reader requests a tag/IC identifier that is determined to be corrupted then the IC may respond with a different code (e.g., an item identifier or other suitable code).

Figure 8:
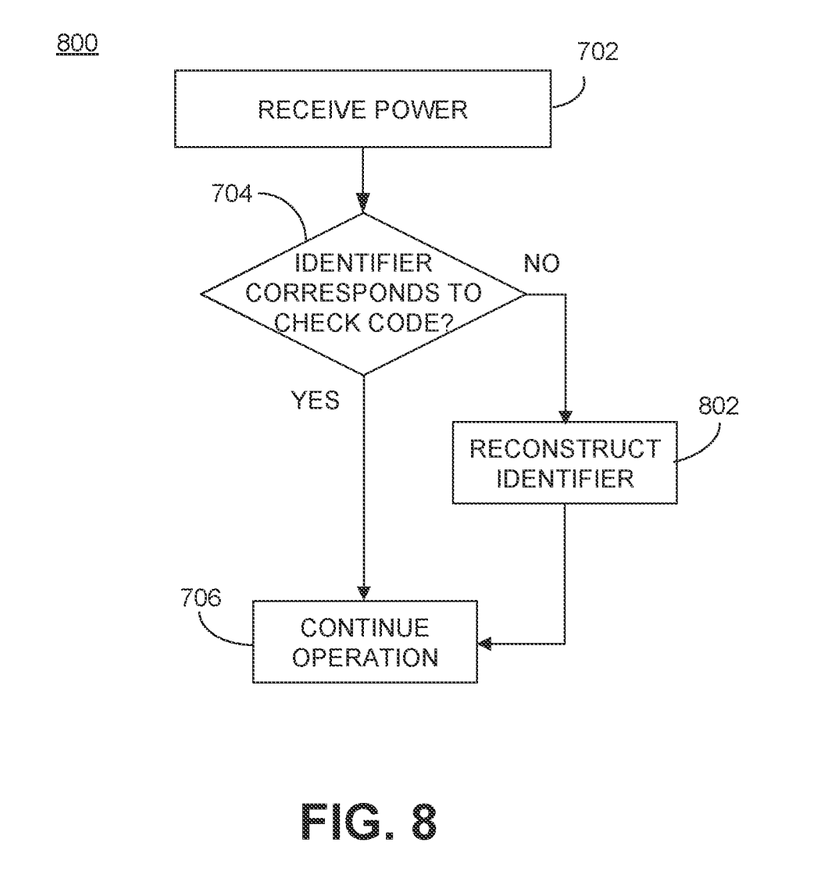
FIG. 8 is a flowchart depicting a process for identifier self-check and correction according to embodiments.

FIG. 8 is a flowchart depicting a process 800 for identifier self-check and correction according to embodiments. Process 800 is similar to processes 700 and 750 described above in FIGS. 7A and 7B. However, in process 800, when the IC detects in step 704 that a retrieved identifier does not correspond to a retrieved check code then the IC may use the retrieved check code (e.g., check code 654) to reconstruct the identifier in step 802. The IC may use the reconstructed identifier for the purposes of replying to a reader command, for overwriting or correcting the stored identifier in memory, for notifying a reader about the nature of the error, or for any other purpose. The IC may then proceed to step 706 where it continues operation.

In some embodiments, upon determining that a retrieved identifier does not correspond to a retrieved check code, the IC may first attempt to re-retrieve the identifier and the check code from the memory to determine if the mismatch is due to an error during the retrieval process. If the re-retrieved identifier corresponds to the re-retrieved check code, then the IC may continue operation (e.g., step 706) by, for example, replying to a received reader command. If the re-retrieved identifier still does not correspond to the re-retrieved check code then the IC may proceed to terminate operation (e.g., step 708), indicate an error (e.g., step 752), or attempt to reconstruct the identifier (e.g., step 802). In some embodiments, the IC may also (or instead) attempt to power-cycle the memory or the IC itself by interrupting and then restoring power to the memory or IC.

The steps described in processes 700, 750, and 800 are for illustration purposes only. An RFID IC identifier self-check may be performed employing additional or fewer steps and in different orders using the principles described herein. Of course the order of the steps may be modified, some steps eliminated, or other steps added according to other embodiments. For example, an IC that has determined that a stored identifier does not correspond to a stored check code may indicate an error (as in step 752), reconstruct the identifier (as in step 802), continue operation (as in step 706), and/or terminate operation (as in step 708), in any order.

In some embodiments, part of the RFID IC identifier self-check process may be performed by an RFID reader. For example, a reader may determine that an IC identifier and a check code stored on the IC do not correspond (e.g., by reading the identifier and check code from the IC and/or receiving an error indication from the IC). In response, the reader may log the incorrect identifier and/or check code (e.g., by storing them locally and/or uploading them to a network), instruct the IC to terminate operation (e.g., as in step 708), reconstruct the identifier (e.g., as in step 802), and/or kill the tag. In some embodiments the reader may write a reconstructed identifier to the IC. The identifier may be reconstructed by the reader (e.g., based on the check code), may have been previously stored on the reader, or received from a remote location (e.g., a networked server).

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

I claim:

1. A Radio Frequency Identification (RFID) integrated circuit (IC) configured to indicate a corrupted identifier, the RFID IC comprising:
   an antenna port;
   a transceiver coupled to the antenna port;
   a memory storing a first identifier and a check code, wherein the check code is based on and used to check a correctness of the first identifier; and
   a processor coupled to the transceiver and the memory, the processor configured to:
      upon the IC extracting an operating power from an RF signal received on the antenna port, retrieve the first identifier and the check code from the memory;
      determine that the check code does not correspond to the first identifier and that the first identifier is therefore corrupted;
      adjust protocol control information associated with the first identifier, wherein an unadjusted protocol control information indicates that the first identifier has a nonzero length and the adjusted protocol control information indicates that the first identifier has a zero length; and
      upon subsequently receiving, via the transceiver, a command requesting the first identifier, transmit, using the transceiver, a reply to the received command, the reply including at least the adjusted protocol control information.

2. The RFID IC of claim 1, wherein the first identifier includes a code indicating at least one of an attribute of the RFID IC and an attribute of an item associated with the RFID IC.

3. The RFID IC of claim 1, wherein at least one bit of the check code is stored in a complementary half of a differential memory cell.

4. The RFID IC of claim 1, wherein the processor is further configured to, upon determining that the first identifier is corrupted, at least one of:
   power-cycle one of the RFID IC and the memory,
   assert a kill flag of the RFID IC,
   write an error code to the memory,
   assert an error flag in the memory,
   adjust a session flag of the RFID IC, or
   rewrite at least a portion of the memory.

5. The RFID IC of claim 1, wherein the check code includes at least one of:
   at least one memory-redundancy bit;
   at least one parity bit;
   a checksum;
   a cyclic redundancy check;
   a hash function output; or
   an error-correcting code.

6. The RFID IC of claim 1, wherein the processor is further configured to at least one of:
   include the first identifier in the reply; or
   compute a cyclic redundancy check based on the reply and include the cyclic redundancy check in the reply.

7. A method for a Radio Frequency Identification (RFID) integrated circuit (IC) to indicate a corrupted identifier, the method comprising:
   receiving a command requesting a first identifier stored in an IC memory;
   in response to receiving the command, retrieving the first identifier and a check code from the IC memory, the check code based on and used to check a correctness of the first identifier;
   determining that the check code does not correspond to the first identifier and that the first identifier is therefore corrupted;
   adjusting protocol control information associated with the first identifier, wherein an unadjusted protocol control information indicates that the first identifier has a nonzero length and the adjusted protocol control information indicate that the first identifier has a zero length; and
   transmitting a reply to the command, the reply including at least the adjusted protocol control information.

8. The method of claim 7, wherein the first identifier includes a code indicating at least one of an attribute of the RFID IC and an attribute of an item associated with the RFID IC.

9. The method of claim 7, wherein at least one bit of the check code is stored in a complementary half of a differential memory cell.

10. The method of claim 7, further comprising, upon determining that the first identifier is corrupted, at least one of:
    power-cycling one of the RFID IC and the memory,
    asserting a kill flag of the RFID IC,
    writing an error code to the memory,
    asserting an error flag in the memory,
    adjusting a session flag of the RFID IC, or
    rewriting at least a portion of the memory.

11. The method of claim 7, wherein the check code includes at least one of:
    at least one memory-redundancy bit;
    at least one parity bit;
    a checksum;
    a cyclic redundancy check;
    a hash function output; or
    an error-correcting code.

12. The method of claim 7, further comprising:
    computing a cyclic redundancy check based on the reply; and
    including the cyclic redundancy check in the reply.

13. The method of claim 7, further comprising including the first identifier in the reply.

14. A Radio Frequency Identification (RFID) integrated circuit (IC) configured to indicate a corrupted identifier, the RFID IC comprising:
    an antenna port;
    a transceiver coupled to the antenna port;
    a memory storing a first identifier and a check code, wherein the check code is based on and used to check a correctness of the first identifier; and a processor coupled to the transceiver and the memory, the processor configured to:
- receive, via the transceiver, a command requesting the first identifier;
- upon receiving the command, retrieve the first identifier and the check code from the memory;
- determine that the check code does not correspond to the first identifier and that the first identifier is therefore corrupted;
- adjust protocol control information associated with the first identifier, wherein an unadjusted protocol control information indicates that the first identifier has a nonzero length and the adjusted protocol control information indicates that the first identifier has a zero length; and
- transmit, via the transceiver, a reply to the received command, the reply including at least the adjusted protocol control information.

15. The RFID IC of claim 14, wherein the first identifier includes a code indicating at least one of an attribute of the RFID IC and an attribute of an item associated with the RFID IC.

16. The RFID IC of claim 14, wherein at least one bit of the check code is stored in a complementary half of a differential memory cell.

17. The RFID IC of claim 14, wherein the processor, upon determining that the first identifier is corrupted, is further configured to at least one of:
- power-cycle one of the RFID IC and the memory,
- assert a kill flag of the RFID IC,
- write an error code to the memory,
- assert an error flag in the memory,
- adjust a session flag of the RFID IC, or
- rewrite at least a portion of the memory.

18. The RFID IC of claim 14, wherein the check code includes at least one of:
- at least one memory-redundancy bit;
- at least one parity bit;
- a checksum;
- a cyclic redundancy check;
- a hash function output; or
- an error-correcting code.

19. The RFID IC of claim 14, wherein the processor is further configured to:
- compute a cyclic redundancy check based on the reply; and
- include the cyclic redundancy check in the reply.

20. The RFID IC of claim 14, wherein the processor is further configured to:
- include the first identifier in the reply.

* * * * *

UNITED STATES PATENT AND TRADEMARK OFFICE
CERTIFICATE OF CORRECTION

| | | |
|---|---|---|
| PATENT NO. | : 11,893,446 B1 | Page 1 of 1 |
| APPLICATION NO. | : 17/749585 | |
| DATED | : February 6, 2024 | |
| INVENTOR(S) | : Christopher J. Diorio | |

It is certified that error appears in the above-identified patent and that said Letters Patent is hereby corrected as shown below:

On the Title Page

On Page 2, In Column 1 item (56) (Other Publications), Line 1, Delete "2 Non-Final" and insert -- Non-Final --, therefor.

In the Specification

In Column 3, Line 8, Delete "signals)" and insert -- signals). --, therefor.

In Column 5, Line 16 (Approx.), Delete "(R-T)" and insert -- (R→T) --, therefor.

In Column 5, Line 17 (Approx.), Delete "(T-R)" and insert -- (T→R) --, therefor.

Signed and Sealed this
Thirty-first Day of December, 2024

Derrick Brent
*Acting Director of the United States Patent and Trademark Office*